(12) United States Patent
Danielson et al.

(10) Patent No.: US 10,800,902 B2
(45) Date of Patent: Oct. 13, 2020

(54) ADDITIVE COMPOSITIONS AND THERMOPLASTIC COMPOSITIONS COMPRISING THE SAME

(71) Applicant: Milliken & Company, Spartanburg, SC (US)

(72) Inventors: Todd D. Danielson, Moore, SC (US); Jamie B. Myers, Greer, SC (US); Jennifer S. Morgan, Simpsonville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 15/485,916

(22) Filed: Apr. 12, 2017

(65) Prior Publication Data

US 2017/0218175 A1     Aug. 3, 2017

Related U.S. Application Data

(63) Continuation of application No. 13/013,277, filed on Jan. 25, 2011, now abandoned.

(51) Int. Cl.
    *C08K 5/1575*      (2006.01)
    *C08K 5/20*      (2006.01)
    (Continued)

(52) U.S. Cl.
CPC ............ *C08K 5/1575* (2013.01); *C08J 3/201* (2013.01); *C08K 5/0041* (2013.01); *C08K 5/20* (2013.01);
(Continued)

(58) Field of Classification Search
CPC ........ C08K 5/20; C08K 5/523; C08K 5/0083; C08K 5/1575
See application file for complete search history.

(56) References Cited

U.S. PATENT DOCUMENTS 3,852,237 A    12/1974   Osborn et al.
4,731,400 A    3/1988   Shigemoto
(Continued)

FOREIGN PATENT DOCUMENTS

CN      1443801      9/2003
EP      1 375 582      1/2004
(Continued)

OTHER PUBLICATIONS

Exxon Mobil Chemical—Nova-Pack Americas 2004, High Speed Stretch Blow Molding of Polypropylene Bottles. Presented by Robert C. Portnoy, Ph.D., on Jan. 26, 2004.
(Continued)

*Primary Examiner* — Peter F Godenschwager
(74) *Attorney, Agent, or Firm* — Robert M. Lanning (57) ABSTRACT

A method for producing a thermoplastic polymer composition comprises the steps of separately providing a thermoplastic polymer and an additive composition and then mixing the thermoplastic polymer and additive composition. The additive composition comprises a clarifying agent and a coloring agent. Another method for producing a thermoplastic polymer composition comprises the steps of separately providing a thermoplastic polymer, a clarifying agent, and a coloring agent and then mixing the thermoplastic polymer, the clarifying agent, and the coloring agent. The coloring agent is present in the composition in an amount to yield a composition exhibiting CIE L*, a*, and b* values falling within a defined color space. An additive composition contains a clarifying agent and a coloring agent. The coloring agent is present in the composition in such an amount that when the additive composition is added to a thermoplastic polymer composition, the thermoplastic polymer composition exhibits CIE L*, a*, and b* values falling within a defined color space.

28 Claims, 2 Drawing Sheets

(51) Int. Cl.
  *C08K 5/523* (2006.01)
  *C08J 3/20* (2006.01)
  *C08K 5/00* (2006.01)

(52) U.S. Cl.
  CPC ........... *C08K 5/523* (2013.01); *C08J 2323/14* (2013.01); *C08K 5/0083* (2013.01)

(56) References Cited

U.S. PATENT DOCUMENTS

| | | | |
|---|---|---|---|
| 4,820,755 A | 4/1989 | Webster | |
| 5,003,500 A | 3/1991 | Gerber | |
| 5,262,471 A | 11/1993 | Akao | |
| 5,859,708 A | 1/1999 | Feldman | |
| 5,961,914 A | 10/1999 | Mannion et al. | |
| 7,683,129 B2 | 3/2010 | Mehta et al. | |
| 8,232,335 B2 | 7/2012 | Danielson et al. | |
| 2004/0180159 A1 | 9/2004 | Neal et al. | |
| 2004/0219319 A1 | 11/2004 | Brooks et al. | |
| 2006/0178483 A1 | 8/2006 | Mehta et al. | |
| 2007/0066733 A1* | 3/2007 | Hanssen | C08K 5/0083 524/394 |
| 2007/0185247 A1* | 8/2007 | Danielson | C08K 5/1575 524/109 |
| 2007/0197697 A1 | 8/2007 | Botkin et al. | |
| 2007/0228615 A1 | 10/2007 | Brooks et al. | |
| 2009/0258560 A1 | 10/2009 | Kristiansen et al. | |
| 2010/0204374 A1 | 8/2010 | Tanji et al. | |

FOREIGN PATENT DOCUMENTS

| | | |
|---|---|---|
| JP | S64-22952 A | 1/1989 |
| JP | H6-109545 A | 4/1994 |
| JP | H6-286009 A | 10/1994 |
| JP | 8-73666 A | 3/1996 |
| JP | H08-231823 | 9/1996 |
| JP | 10-17848 | 1/1998 |
| JP | H11-158361 A | 6/1999 |
| JP | 11-349740 | 12/1999 |
| JP | 2000-111408 A | 4/2000 |
| JP | 2000-302986 | 10/2000 |
| JP | 2007-161958 A | 6/2007 |
| JP | 2009-526123 | 7/2009 |
| JP | 2013-513014 | 4/2013 |
| WO | WO 03/095546 A1 | 11/2003 |
| WO | WO 2005/115723 A2 | 12/2005 |
| WO | WO 2007/033297 A1 | 3/2007 |
| WO | WO 2007/092462 A2 | 8/2007 |
| WO | WO 2008/011402 A1 | 1/2008 |
| WO | WO 2011/071718 A2 | 6/2011 |

OTHER PUBLICATIONS

OPP Bottles using high speed 2-stage SBM process, Plastic Technologies, Inc., PO Box 964, Holland, OH. Presented at Nova Pack Americas 2004 by Scott Steele on Jan. 26, 2004.

Statement of Bernard Vermeersch, regarding facts of SIPA Bottle, dated Mar. 1, 2006. Non-Analysis Agreement—Milliken & Company and Sipa SpA, dated Mar. 2003.

CIE International Commission on Illumination "*Advancing Knowledge and Providing Standardization to Improve the Lighted Environment*".

CIELAB "*Color Models*".

Konica Minolta "*Identifying Color Differences Using L*z*b* or L*C*H Coordinates*".

X-rite "*A Guide to Understanding Color Communication*".

Experimental Report on WO 2007/092462 submitted by Adeka Corporation in Opposition to European U.S. Pat. No. 2 668 229.

Luo et al., "*The Development of the CIE 2000 Colour-Difference Formula: CIEDE2000*", Colour Research Application, 2000, pp. 340-350.

Hoffmann et al., Macromol. Symp. 2001, 176, 83-92.

Kučrová, J., "Nucleating and clarifying agents for polymers," Batchelor Thesis, Tomas Bata University, Zlín, 2008.

* cited by examiner

ADDITIVE COMPOSITIONS AND THERMOPLASTIC COMPOSITIONS COMPRISING THE SAME

CROSS REFERENCE TO RELATED APPLICATIONS

This application is a continuation of U.S. patent application Ser. No. 13/013,277 filed on Jan. 25, 2011, which application is hereby incorporated by reference.

TECHNICAL FIELD OF THE INVENTION

The subject matter of this application and the inventions described herein are generally directed to additive compositions and thermoplastic polymer compositions containing such additive compositions.

BACKGROUND

Thermoplastic polymers have become ubiquitous in the modern world. The versatility of thermoplastic polymers and the relative ease with which they can be processed into myriad different forms have contributed to their rise to ubiquity. This versatility is partly attributable to the nature of the thermoplastic polymers themselves, but at least a portion of this versatility is attributable to the development of additives that permit the modification of the physical properties of these polymers.

For example, polypropylene homopolymers and polypropylene copolymers, which are typically only slightly translucent, can be made more translucent or even virtually transparent using a class of additives known as clarifying agents. The development and use of such clarifying agents have opened up an entirely new range of applications for polypropylene polymers, a range of applications that was previously reserved for those polymers which are naturally or more readily made translucent or transparent (e.g., polystyrene). For instance, clarifying agents have made it possible to use polypropylene polymers in transparent packaging and containers.

While the development and use of certain additives (e.g., clarifying agents) have enabled improvements in certain physical properties of thermoplastic polymers, there remains room for improvement. In particular, Applicants believe that a need remains for combinations of additives that will further improve the aesthetic qualities of thermoplastic polymers, such as clarified polypropylene polymers. This application and the inventions described herein seek to address this need.

BRIEF SUMMARY OF THE INVENTION

The invention generally provides additive compositions suitable for addition to thermoplastic polymers, thermoplastic polymer compositions containing a clarifying agent and at least one coloring agent, and methods for making such thermoplastic polymer compositions. In general, the additive compositions comprise a clarifying agent and a relatively low level of at least one coloring agent, where the type and amount of coloring agent is selected so that a thermoplastic polymer composition containing the additive composition exhibits CIE L*, a*, and b* values falling within a specified color space. This color space can be defined in terms of either the absolute L*, a*, and b* values of a thermoplastic polymer composition containing the additive composition or the change in the a* and b* values exhibited by a thermoplastic polymer composition containing the additive composition relative to a control thermoplastic polymer composition that does not contain the coloring agent(s). Similarly, the thermoplastic polymer compositions of the invention contain a clarifying agent and at least one coloring agent, where the type and amount of coloring agent(s) is selected so that the thermoplastic polymer composition exhibits CIE L*, a*, and b* values falling within a specified color space. Once again, this color space can be defined in terms of either the absolute L*, a*, and b* values of the thermoplastic polymer composition or the change in the a* and b* values exhibited by the thermoplastic polymer composition relative to a control thermoplastic polymer composition that does not contain the coloring agent(s).

In contrast to the more typical use for coloring agents, in which the type and amount of the coloring agent(s) is selected so as to impart a substantial and readily perceptible color to the polymer, the compositions of the invention are designed so that the thermoplastic polymer composition (e.g., a thermoplastic polymer composition containing the additive composition or a thermoplastic polymer composition containing the recited clarifying agent and coloring agent(s)) is not perceived to be substantially colored. Thus, the compositions of the invention generally employ levels of coloring agent(s) that are substantially lower than those used in polymer compositions that are designed to be colored. The design of these compositions is based upon Applicant's discovery that clarified thermoplastic polymers containing relatively small amounts of coloring agent(s) (e.g., amounts and types of coloring agent(s) which produce a polymer falling within a specified portion of the CIE L*a*b* color space) are generally perceived as more visually appealing than clarified thermoplastic polymers that do not contain the coloring agent(s). In some instances, these thermoplastic polymers are perceived and described as appearing more transparent (e.g., exhibiting less haze) than a clarified thermoplastic polymer that does not contain the coloring agent(s), even though there is no measurable decrease in the haze of the thermoplastic polymer. With this discovery in hand, Applicants developed the various embodiments of the invention described herein.

In a first embodiment, the invention provides a method for producing a thermoplastic polymer composition, the method comprising the steps of:
(a) providing a thermoplastic polymer;
(b) providing an additive composition comprising:
(i) at least one clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$; and (ii) a coloring agent; and (c) mixing the thermoplastic polymer and the additive composition to produce a thermoplastic polymer composition, wherein the thermoplastic polymer and the additive composition are separately provided; wherein the amount of clarifying agent in the thermoplastic polymer composition is from about 100 ppm to about 5,000 ppm based on the total weight of the thermoplastic polymer composition; wherein the amount of coloring agent present in the thermoplastic polymer composition is sufficient to produce a thermoplastic polymer composition exhibiting a $\Delta a^*$ value and a $\Delta b^*$ value satisfying each of the following inequalities $$\Delta b^* \leq 0 - (2.8571 \times \Delta a^*)$$

$$\Delta b^* \geq -1.5231 + (5.8461 \times \Delta a^*)$$

$$\Delta b^* \geq -2.6000 - (1.0909 \times \Delta a^*)$$

$$\Delta b^* \leq 0 + (1.2727 \times \Delta a^*)$$

wherein $\Delta b^*$ is not zero; wherein the $\Delta a^*$ value and the $\Delta b^*$ value are calculated by measuring an a* value and a b* value exhibited by a 1.27 mm (50 mil) plaque made from a control thermoplastic polymer composition, measuring an a* value and a b* value exhibited by a 1.27 mm (50 mil) plaque made from the thermoplastic polymer composition, and subtracting the a* and b* values for the plaque made from the control thermoplastic polymer composition from the a* and b* values for the plaque made from the thermoplastic polymer composition; and wherein the control thermoplastic polymer composition contains the thermoplastic polymer and the clarifying agent but does not contain the coloring agent.

In a second embodiment, the invention provides a method for producing a thermoplastic polymer composition, the method comprising the steps of:

(a) providing a thermoplastic polymer;

(b) providing a clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$;

(c) providing a coloring agent; and (d) mixing the thermoplastic polymer, the clarifying agent, and the coloring agent to produce a thermoplastic polymer composition, wherein the thermoplastic polymer, the clarifying agent, and the coloring agent are each separately provided; wherein the amount of clarifying agent present in the thermoplastic polymer composition is from about 100 ppm to about 5,000 ppm based on the total weight of the thermoplastic polymer composition; wherein the amount of coloring agent in the thermoplastic polymer composition is sufficient to produce a thermoplastic polymer composition exhibiting a $\Delta a^*$ value and a $\Delta b^*$ value satisfying each of the following inequalities $$\Delta b^* \leq 0 - (2.8571 \times \Delta a^*)$$

$$\Delta b^* \geq -1.5231 + (5.8461 \times \Delta a^*)$$

$$\Delta b^* \geq -2.6000 - (1.0909 \times \Delta a^*)$$

$$\Delta b^* \leq 0 + (1.2727 \times \Delta a^*)$$

wherein $\Delta b^*$ is not zero; wherein the $\Delta a^*$ value and the $\Delta b^*$ value are calculated by measuring an a* value and a b* value exhibited by a 1.27 mm (50 mil) plaque made from a control thermoplastic polymer composition, measuring an a* value and a b* value exhibited by a 1.27 mm (50 mil) plaque made from the thermoplastic polymer composition, and subtracting the a* and b* values for the plaque made from the control thermoplastic polymer composition from the a* and b* values for the plaque made from the thermoplastic polymer composition; and wherein the control thermoplastic polymer composition contains the thermoplastic polymer and the clarifying agent but does not contain the coloring agent.

In a third embodiment, the invention provides an additive composition consisting essentially of:

(a) a clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$; and (b) a coloring agent, wherein the coloring agent is present in the additive composition in an amount such that a thermoplastic polymer composition exhibits a $\Delta a^*$ value and a $\Delta b^*$ value satisfying each of the following inequalities $$\Delta b^* \leq 0 - (2.8571 \times \Delta a^*)$$

$$\Delta b^* \geq -1.5231 + (5.8461 \times \Delta a^*)$$

$\Delta b^* \geq -2.6000-(1.0909 \times \Delta a^*)$ $\Delta b^* \leq 0+(1.2727 \times \Delta a^*)$ wherein Δb* is not zero; wherein the thermoplastic polymer composition comprises a thermoplastic polymer and the additive composition in an amount sufficient to provide about 100 ppm to about 5,000 ppm of the clarifying agent in the thermoplastic polymer composition, based on the total weight of the thermoplastic polymer composition; and wherein the Δa* value and the Δb* value are calculated by measuring an a* value and a b* value exhibited by a 1.27 mm (50 mil) plaque made from a control thermoplastic polymer composition, measuring an a* value and a b* value exhibited by a 1.27 mm (50 mil) plaque made from the thermoplastic polymer composition, and subtracting the a* and b* values for the plaque made from the control thermoplastic polymer composition from the a* and b* values for the plaque made from the thermoplastic polymer composition; and wherein the control thermoplastic polymer composition contains the thermoplastic polymer and the clarifying agent but does not contain the coloring agent.

In a fourth embodiment, the invention provides a method for producing a thermoplastic polymer composition, the method comprising the steps of:
  (a) providing a thermoplastic polymer;
  (b) providing an additive composition comprising:
    (i) at least one clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

(I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —CH$_2$OH and —CHOHCH$_2$OH; and
    (ii) a coloring agent; and
  (c) mixing the thermoplastic polymer and the additive composition to produce a thermoplastic polymer composition,
  wherein the thermoplastic polymer and the additive composition are separately provided; wherein the amount of clarifying agent in the thermoplastic polymer composition is from about 100 ppm to about 5,000 ppm based on the total weight of the thermoplastic polymer composition; wherein the amount of coloring agent present in the thermoplastic polymer composition is sufficient to produce a thermoplastic polymer composition exhibiting an a* value and a b* value satisfying each of the following inequalities $b^* \leq 3.4-(1.4196 \times a^*)$

$b^* \geq 3.1+(9 \times a^*)$ $b^* \geq 1-a^*$ $b^* \leq 3.6174+(0.7449 \times a^*)$ wherein the a* value and the b* value are determined by measuring an a* value and a b* value exhibited by a 1.27 mm (50 mil) plaque made from the thermoplastic polymer composition.

In a fifth embodiment, the invention provides a method for producing a thermoplastic polymer composition, the method comprising the steps of:
  (a) providing a thermoplastic polymer;
  (b) providing a clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

(I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —CH$_2$OH and —CHOHCH$_2$OH;
  (c) providing a coloring agent; and
  (d) mixing the thermoplastic polymer, the clarifying agent, and the coloring agent to produce a thermoplastic polymer composition,
  wherein the thermoplastic polymer, the clarifying agent, and the coloring agent are each separately provided; wherein the amount of clarifying agent present in the thermoplastic polymer composition is from about 100 ppm to about 5,000 ppm based on the total weight of the thermoplastic polymer composition; wherein the amount of coloring agent in the thermoplastic polymer composition is sufficient to produce a thermoplastic polymer composition exhibiting an a* value and a b* value satisfying each of the following inequalities $b^* \leq 3.4-(1.4196 \times a^*)$ $b^* \geq 3.1+(9 \times a^*)$

$b^* \geq 1-a^*$ $b^* \leq 3.6174+(0.7449 \times a^*)$ wherein the a* value and the b* value are determined by measuring an a* value and a b* value exhibited by a 1.27 mm (50 mil) plaque made from the thermoplastic polymer composition.

In a sixth embodiment, the invention provides an additive composition consisting essentially of:
  (a) a clarifying agent selected from the group consisting of trisamides, aluminum 2,2'-methylenebis-(4,6-di-tert-butylphenyl) phosphate, lithium 2,2'-methylenebis(4,6-di-tertbutylphenyl) phosphate, monocarboxylate compounds, and acetal compounds conforming to the structure of Formula (I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$; and (b) a coloring agent, wherein the coloring agent is present in the additive composition in an amount such that a thermoplastic polymer composition exhibits a a* value and a b* value satisfying each of the following inequalities $b^* \leq 3.4 - (1.4196 \times a^*)$ $b^* \geq 3.1 + (9 \times a^*)$ $b^* \geq 1 - a^*$ $b^* \leq 3.6174 + (0.7449 \times a^*)$ wherein the thermoplastic polymer composition comprises a thermoplastic polymer and the additive composition in an amount sufficient to provide about 100 ppm to about 5,000 ppm of the clarifying agent in the thermoplastic polymer composition, based on the total weight of the thermoplastic polymer composition; and wherein the a* value and the b* value are determined by measuring an a* value and a b* value exhibited by a 1.27 mm (50 mil) plaque made from the thermoplastic polymer composition.

DETAILED DESCRIPTION OF THE INVENTION

As described above, the invention provides additive compositions suitable for addition to thermoplastic polymers, thermoplastic polymer compositions containing a clarifying agent and at least one coloring agent, and methods for making such thermoplastic polymer compositions. The various aspects of these embodiments of the invention will be described below.

The thermoplastic polymer utilized in the invention can be any suitable thermoplastic polymer. As utilized herein, the term "thermoplastic polymer" refers to a polymeric material that will melt upon exposure to sufficient heat to form a flowable liquid and will return to a solidified state upon sufficient cooling. In certain preferred embodiments, the thermoplastic polymer is a polyolefin. The thermoplastic polymer can be any suitable polyolefin, such as a polypropylene, a polyethylene, a polybutylene, and a poly(4-methyl-1-pentene), and combinations or mixtures thereof. In certain preferred embodiments, the thermoplastic polymer is a polyolefin selected from the group consisting of polypropylene homopolymers (e.g., atactic polypropylene, isotactic polypropylene, and syndiotactic polypropylene), polypropylene copolymers (e.g., polypropylene random copolymers), and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of about 10 wt. % or less (e.g., about 1 to about 7 wt. %, or about 1 to about 4.5 wt. %).

The clarifying agent utilized in the additive compositions and methods of the invention can be any suitable clarifying agent. Suitable clarifying agents include, but are not limited to, trisamides, bisphenol phosphates, monocarboxylate compounds, and acetal compounds. For example, suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. Suitable bisphenol phosphate clarifying agents include 2,2'-methylenebis-(4,6-di-tert-butylphenyl) phosphate salts, such as aluminum 2,2'-methylenebis-(4,6-di-tert-butylphenyl) phosphate, lithium 2,2'-methylenebis(4,6-di-tert-butylphenyl) phosphate, and combinations thereof. Suitable acetal clarifying agents include the acetal compounds produced by the condensation reaction of a polyhydric alcohol and an aromatic aldehyde. Polyhydric alcohols suitable for producing such acetal clarifying agents include, but are not limited to, acyclic polyols, such as xylitol and sorbitol. Aromatic aldehydes suitable for producing such acetal clarifying agents include, but are not limited to, aromatic aldehydes containing a single aldehyde group with the remaining positions on the aromatic ring being either unsubstituted or substituted. Thus, suitable aromatic aldehydes include benzaldehyde and substituted benzaldehydes (e.g., 3,4-dimethyl-benzaldehyde). The acetal compound produced by the above-described reaction can be a mono-acetal, di-acetal, or tri-acetal compound (i.e., a compound containing one, two, or three acetal groups, respectively), with the di-acetal compounds being preferred.

In certain possibly preferred embodiments, the clarifying agent is selected from the group consisting of acetal compounds conforming to the structure of Formula (I)

In the structure of Formula (I), $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens. $R_{11}$ is a hydroxyalkyl group selected from the group consisting of —$CH_2OH$ and —$CHOHCH_2OH$. In certain possibly preferred embodiments, the acetal compound is a compound of Formula (I) in which $R_1$, $R_2$, $R_3$, $R_4$, $R_5$, $R_6$, $R_7$, $R_8$, $R_9$, and $R_{10}$ are each hydrogen and $R_{11}$ is —$CHOHCH_2OH$. In certain possibly preferred embodiments, the acetal compound is a compound of Formula (I) in which $R_1$, $R_2$, $R_4$, $R_5$, $R_6$, $R_7$, $R_9$, and $R_{10}$ are each hydrogen, $R_3$ and $R_8$ are each a methyl group, and $R_{11}$ is —$CHOHCH_2OH$. In certain possibly preferred embodiments, the acetal compound is a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —$CHOHCH_2OH$. Of course, the compositions of the invention can contain any suitable mixture of the clarifying agents described above. For example, the composition of the invention can contain a mixture of two or more different acetal compounds conforming to the structure of Formula (I), such as a mixture of any of the specific acetal compounds described above.

The clarifying agent can be present in the compositions of the invention in any suitable amount. As will be understood by those skilled in the art, the suitable amount of the clarifying agent will depend upon several factors, such as the identity of the particular clarifying agent, the particular polymer that is to be clarified using the clarifying agent, and the desired level of clarity and/or haze for the finished polymer composition. In certain possibly preferred embodiments, the clarifying agent is present in the thermoplastic polymer composition in an amount of about 100 ppm to about 5,000 ppm based on the total weight of the thermoplastic polymer composition. In certain possibly preferred embodiments, such as when the clarifying agent is an acetal compound conforming to the structure of Formula (I), the clarifying agent is present in the thermoplastic polymer composition in an amount of about 1,000 ppm to about 2,500 ppm based on the total weight of the thermoplastic polymer composition.

In addition to the clarifying agent, the compositions of the invention contain at least one coloring agent. Suitable coloring agents include, but are not limited to, pigments, dyes, polymeric colorants, and mixtures thereof. As utilized herein, the term "polymeric colorant" refers to a colorant comprising a chromophore and at least one oligomeric or polymer constituent bound to the chromophore. Suitable polymeric colorants include, but are not limited to, the polymeric colorants sold by Milliken & Company. The dye can be any suitable dye, such as an acid dye, a solvent dye, a vat dye, or mixtures thereof. Suitable dyes include, but are not limited to, Acid Blue 9, Acid Blue 74, Solvent Blue 97, Vat Blue 6, and mixtures or combinations thereof. For example, in certain embodiments, the coloring agent can comprise a mixture of Vat Blue 6 and Acid Blue 74. In certain possibly preferred embodiments, the coloring agent comprises a pigment. Suitable pigments include, but are not limited to, Pigment Blue 29, Pigment Blue 63, Pigment Violet 15, and mixtures thereof.

As opposed to compositions in which a coloring agent is used to impart substantial and perceptible color to the composition and any article made therefrom, the compositions of the invention contain a relatively small amount of the coloring agent. Indeed, the amount of coloring agent present in the thermoplastic polymer compositions of the invention is sufficiently low that most observers would describe the polymer composition or any article made therefrom as being not substantially colored. In fact, when observed with the naked eye, the hue imparted to the polymer composition or an article made therefrom by the coloring agent may be perceptible only after the polymer composition or article is compared to a similar composition or article that does not contain the coloring agent. With such a low loading of the coloring agent in the compositions of the invention and given the fact that different coloring agents often exhibit different strengths, it is difficult to meaningfully express the amount of coloring agent present in the compositions of the invention using customary units, such as weight-based concentrations or percentages. Thus, Applicants have found that the amount of coloring agent present in the compositions of the invention is best quantified and bound by specifying the CIE L*a*b* color space of a 1.27 mm (50 mil) thick plaque made using the composition (i.e., a plaque made from a thermoplastic polymer composition containing the additive composition of the invention or a plaque made from the thermoplastic polymer composition of the invention). As demonstrated in the Examples that follow, Applicants discovered that a composition containing an amount of the coloring agent sufficient to produce a plaque having certain L*, a*, and b* values would be perceived as visually appealing (both by itself and also as compared to a control that did not contain the coloring agent) and yet would still be perceived and described as not substantially colored. Furthermore, Applicants discovered that articles produced from such a composition are often perceived to have lower haze or greater clarity than similar articles produced from a composition that does not contain the coloring agent, even though haze measurements of such articles reveal that the haze values are not lower.

Within this model, the amount of coloring agent can be expressed in terms of the change in the a* and b* values relative to a control, or the amount of the coloring agent can be expressed in terms of the absolute L*, a*, and b* values exhibited by a plaque made using the thermoplastic polymer composition. In those embodiments in which the amount of the coloring agent is expressed in terms of the change in the a* and b* values, the Δa* and Δb* values are calculated by measuring the a* and b* values exhibited by a 1.27 mm (50 mil) thick plaque made from a control thermoplastic polymer composition and measuring the a* and b* values exhibited by a 1.27 mm (50 mil) thick plaque made from the thermoplastic polymer composition of the invention (i.e., the thermoplastic polymer composition made by a method of the invention or a thermoplastic polymer composition made by adding an additive composition of the invention to a thermoplastic polymer). The control thermoplastic polymer composition is substantially identical to the thermoplastic polymer composition of the invention, differing only in the fact that it does not contain the coloring agent(s). The a* and b* values for the plaque made from the control thermoplastic polymer composition are then respectively subtracted from the a* and b* values for the plaque made from the thermoplastic polymer composition of the invention to yield the Δa* and Δb* values resulting from the presence of the coloring agent in the composition of the invention. When expressed in terms of the change in a* and b* values, Applicants have found that the compositions of the invention have Δa* and Δb* values satisfying each of the following inequalities $$\Delta b^* \leq 0 - (2.8571 \times \Delta a^*)$$

$$\Delta b^* \geq -1.5231 + (5.8461 \times \Delta a^*)$$

$$\Delta b^* \geq -2.6000-(1.0909 \times \Delta a^*)$$

$$\Delta b^* \leq 0+(1.2727 \times \Delta a^*)$$

when $\Delta b^*$ is not zero. In certain possibly preferred embodiments, the $\Delta a^*$ and $\Delta b^*$ values satisfy each of the following inequalities $$\Delta b^* \leq 0-(2.8571 \times \Delta a^*)$$

$$\Delta b^* \geq -1.325+(7.4 \times \Delta a^*)$$

$$\Delta b^* \geq -2.5385-(2.3077 \times \Delta a^*)$$

$$\Delta b^* \leq 1.8+(7.3333 \times \Delta a^*)$$

$$\Delta b^* \leq 0+(1.2727 \times \Delta a^*)$$

when $\Delta b^*$ is not zero. In certain possibly preferred embodiments, the $\Delta a^*$ and $\Delta b^*$ values satisfy each of the following inequalities $$\Delta b^* \leq 0-(2.8571 \times \Delta a^*)$$

$$\Delta b^* \geq -0.8+(7.4 \times \Delta a^*)$$

$$\Delta b^* \geq -1.75-(2.3077 \times \Delta a^*)$$

$$\Delta b^* \leq 0.9+(7.3333 \times \Delta a^*)$$

$$\Delta b^* \leq 0+(1.2727 \times \Delta a^*)$$

when $\Delta b^*$ is not zero.

As noted above, the amount of the coloring agent can be expressed in terms of the absolute L*, a*, and b* values exhibited by a plaque made using the thermoplastic polymer composition. In these embodiments, the L*, a*, and b* values are determined by measuring the a* and b* values exhibited by a 1.27 mm (50 mil) thick plaque made from the thermoplastic polymer composition of the invention (i.e., the thermoplastic polymer composition made by a method of the invention or a thermoplastic polymer composition made by adding an additive composition of the invention to a thermoplastic polymer). When expressed in terms of the absolute L*, a*, and b* values, Applicants have found that the compositions of the invention have a* and b* values satisfying each of the following inequalities $$b^* \leq 3.4-(1.4196 \times a^*)$$

$$b^* \geq 3.1+(9 \times a^*)$$

$$b^* \geq 1-a^*$$

$$b^* \leq 3.6174+(0.7449 \times a^*).$$

In certain possibly preferred embodiments, the a* and b* values satisfy each of the following inequalities $$b^* \leq 3.4-(1.4196 \times a^*)$$

$$b^* \geq 3.35+(10.25 \times a^*)$$

$$b^* \geq 1.0313-(1.7187 \times a^*)$$

$$b^* \leq 5.1+(4.6364 \times a^*)$$

$$b^* \leq 3.6174+(0.7449 \times a^*)$$

In certain possibly preferred embodiments, the a* and b* values satisfy each of the following inequalities $$b^* \leq 3.4-(1.4196 \times a^*)$$

$$b^* \geq 4.2+(10.25 \times a^*)$$

$$b^* \geq 1.8-(1.7187 \times a^*)$$

$$b^* \leq 4.6+(4.6364 \times a^*)$$

$$b^* \leq 3.6174+(0.7449 \times a^*)$$

As is apparent from the description set forth above, the inequalities for both the change in a* and b* values and the absolute a* and b* values do not specify the L* values of the plaque produced using the thermoplastic polymer composition. Applicants' experiments revealed that the a* and b* values played a much larger role in quantifying and bounding the amount of coloring agent present in the compositions of the invention and determining which compositions would be judged to be more visually appealing. Thus, the plaques made from the compositions of the invention can exhibit any suitable L* value. In certain possibly preferred embodiments, the plaques exhibit an L* value of about 88 or greater.

The L*, a*, and b* values of the compositions can be measured using any suitable technique. The L*, a*, and b* values typically are measured using a spectrophotometer. In particular, the L*, a*, and b* values can be measured using the spectrophotometer in reflectance mode with a large area view under a cool white fluorescent light source (a UV filter is used to exclude UV light from the light source) and a 10° observer with specular reflectance included in the measurement. The measurements can be taken with the spectrophotometer's white calibration tile placed behind the sample. In order to more precisely quantify the L*, a*, and b* values, a measurement can be taken on at least five separate 50.8 mm×76.2 mm×1.27 mm (2.00 inch×3.00 inch×0.05 inch) test plaques made from the polymer composition, and the measurements can be averaged to yield a single set of L*, a*, and b* values for the polymer composition from which the plaques are made. As noted in the examples that follow, the above-described procedure was used by Applicants to determine the L*, a*, and b* values during their experiments and, therefore, the L*, a*, and b* values preferably are determined using this procedure.

As described above, the invention provides an additive composition consisting essentially of a clarifying agent and a coloring agent. As utilized in connection with this embodiment of the invention, the term "consisting essentially of" is used to distinguish the additive composition from a thermoplastic polymer to which the additive composition has been added. In other words, the term is used to indicate that the additive composition is formulated in such a way that it is intended to be added to a thermoplastic polymer, rather than being used by itself in the fabrication of finished articles. Thus, as used in this context, the term "consisting essentially of" indicates that, if a thermoplastic polymer is present in the additive composition, the relative amount of thermoplastic polymer present in the additive composition is substantially less than the amount of thermoplastic polymer that is present in a "finished" polymer composition that is to be used in molding or other processes for producing an article. Accordingly, in certain possibly preferred embodiments, the additive composition contains about 90 wt. % or less (e.g., about 85 wt. % or less or about 80 wt. % or less) thermoplastic polymer based on the total weight of the additive composition. In certain other embodiments, the additive composition contains about 25 wt. % or less (e.g., about 20 wt. % or less, about 15 wt. % or less, about 10 wt. % or less, or about 5 wt. % or less) thermoplastic polymer based on the total weight of the additive composition. As used in connection with the additive composition, the term "consisting essentially of" is not intended to exclude the presence of other additives that are typically used in thermoplastic polymers, such as nucleating agents, antioxidants, acid scavengers, slip agents, antistatic agents, optical brighteners, and polymer processing aids. Thus, the additive composition of the invention can be a masterbatch containing the clarifying agent, the coloring agent, a carrier resin, and, optionally, other additives, or the additive composition can be a non-dusting blend (NDB) containing the clarifying agent, the coloring agent, and, optionally, other additives.

As noted above, the invention provides methods for producing thermoplastic polymer compositions. In a first method embodiment, the method comprises the steps of providing a thermoplastic polymer, providing an additive composition comprising at least one clarifying agent and a coloring agent, and mixing the thermoplastic polymer and the additive composition to produce a thermoplastic polymer composition. In this method embodiment, the thermoplastic polymer, the clarifying agent, and the coloring agent can be any of those described above. Also, in this embodiment, the thermoplastic polymer and the additive composition are separately provided. In other words, the thermoplastic polymer and the additive composition are provided in separate forms or compositions that are not mixed together until the recited mixing step. In this embodiment, the thermoplastic polymer can be provided in a composition comprising other additives typically used in polymer processing, such as antioxidants, acid scavengers, slip agents, and polymer processing aids. The additive composition can also comprise other additives typically used in polymer processing, such as those described above.

In a second method embodiment, the method comprises the steps of providing a thermoplastic polymer, providing a clarifying agent, providing a coloring agent, and mixing the thermoplastic polymer, the clarifying agent, and the coloring agent to produce a thermoplastic polymer composition. In this method embodiment, the thermoplastic polymer, the clarifying agent, and the coloring agent can be any of those described above. Also, in this embodiment, the thermoplastic polymer, the clarifying agent, and the coloring agent are separately provided. In other words, the thermoplastic polymer, the clarifying agent, and the coloring agent are provided in separate forms or compositions that are not mixed together until the recited mixing step. As in the other method embodiment, the thermoplastic polymer can be provided in a composition comprising other additives typically used in polymer processing. Similarly, the clarifying agent and the coloring agent can be contained in separate compositions comprising other additives typically used in polymer processing.

Each of the method embodiments described above involves a mixing step. In each method, the separate components can be mixed using any suitable technique or apparatus. For example, the components can be mixed in a paddle blender, ribbon blender, double cone blender, vertical screw mixer (e.g., Nauta mixer), plough mixer, or high shear mixer. Several of the mixing apparatus listed above can be operated in either a batch or continuous mode and, therefore, the mixing step can be performed in either a batchwise or continuous fashion. The components can be mixed for any suitable amount of time, but generally the components are mixed until they are substantially uniformly blended.

The following examples further illustrate the subject matter described above but, of course, should not be construed as in any way limiting the scope thereof.

EXAMPLE

This example demonstrates the production of thermoplastic polymer compositions according to the invention and certain properties of such polymer compositions. Several different polymer compositions were prepared using an 11 MFR (Melt Flow Rate) Ziegler-Natta catalyzed polypropylene random copolymer as the thermoplastic polymer. Each polymer composition labeled as "Sample" was prepared by incorporating into the thermoplastic polymer 1800 ppm of a clarifying agent (i.e., Millad® 3988i clarifying agent from Milliken & Company), a standard stabilization package (i.e., 500 ppm Irganox 1010, 1000 ppm Irgafos 168, and 800 ppm calcium stearate), and one or more coloring agents. The particular coloring agent(s) used in each polymer composition and the amount of such coloring agent(s) are set forth in Tables 1, 2, and 3 below. Control polymer compositions (labeled "Control") were also prepared and contained the same thermoplastic polymer, the same additive package, and 1800 ppm of the clarifying agent. Thus, the only difference between the "Sample" polymer compositions and the "Control" polymer compositions is the presence of the coloring agent(s).

In order to accurately add very small amounts of coloring agents into the polymer, a blend of the clarifying agent and the desired coloring agent(s) was first prepared. This blend contained a higher level of the coloring agent(s) than was ultimately desired, so that it could be more easily measured and blended with the polymer. To make the blend, the desired coloring agent(s) were added to one hundred (100.0) gram batches of the clarifying agent to yield a mixture containing approximately 5.2632 wt. % coloring agent. The resulting mixture was then blended on a Cuisinart® Classic food processor (Model DFP-14BCN) for approximately 2 minutes. The resulting mixture was further diluted by adding additional clarifying agent to yield a mixture containing approximately 1.3699 wt. % coloring agent and then blended on the Cuisinart® Classic food processor (Model DFP-14BCN) for approximately 2 minutes. The resulting blend of clarifying agent and coloring agent(s) was then added to the polymer to produce the thermoplastic polymer composition.

In order to produce the polymer compositions, the required amount of the clarifying agent and coloring agent(s) blend was mixed with 1000 grams of the polypropylene polymer, the standard stabilization package, and an additional amount of the clarifying agent. The amount of additional clarifying agent used brought the total of amount of clarifying agent in the polymer composition up to 1800 ppm. All of the components were mixed using a KitchenAid® Artisan® 5 quart tilt-head mixer set on the lowest setting (Stir) for approximately 5 minutes. The resulting mixture was then melt compounded on a Deltaplast 1 inch diameter, L/D 30:1 single screw extruder with a temperature profile ramping up to 230° C. The melt-compounded polymer composition was then injection molded using a 40-ton ARBURG ALLROUNDER 221 K injection molding machine to produce twenty-five 50.8 mm×76.2 mm×1.27 mm (2.00 inch×3.00 inch×0.05 inch) test plaques with a 230° C. flat profile barrel temperature and no backpressure. These plaques were then used to conduct the CIE L*a*b* measurements described below and were also used during the panel evaluations described below.

TABLE 1

Coloring Agent(s) and Coloring Agent Loadings used in Control 1 and Samples 1-61.

| Sample | Coloring Agent(s) | Coloring Agent Loadings |
|---|---|---|
| Control 1 | None | — |
| 1 | Pigment Blue 29/ Pigment Violet 15 | 4.5 ppm/3 ppm |

TABLE 1-continued

Coloring Agent(s) and Coloring Agent Loadings used in Control 1 and Samples 1-61.

| Sample | Coloring Agent(s) | Coloring Agent Loadings |
|---|---|---|
| 2 | Pigment Blue 29/Pigment Violet 15 | 4.05 ppm/2.7 ppm |
| 3 | Pigment Blue 29/Pigment Violet 15 | 9 ppm/6 ppm |
| 4 | Acid Blue 74 | 25 ppm |
| 5 | Acid Blue 74 | 100 ppm |
| 6 | Acid Blue 9 | 25 ppm |
| 7 | Vat Blue 6 | 2 ppm |
| 8 | Solvent Blue 97 | 2 ppm |
| 9 | Pigment Blue 63 | 2 ppm |
| 10 | Pigment Blue 29 | 2 ppm |
| 11 | Pigment Blue 29 | 25 ppm |
| 12 | Acid Blue 9/Food Red 7/Food Yellow 5 | 0.36 ppm/0.18 ppm/0.45 ppm |
| 13 | Solvent Black 7 | 0.54 ppm |
| 14 | Solvent Black 7 | 2 ppm |
| 15 | Solvent Black 7 | 25 ppm |
| 16 | Acid Blue 74 | 2 ppm |
| 17 | Acid Blue 9 | 1.8 ppm |
| 18 | Acid Blue 9 | 2 ppm |
| 19 | Solvent Black 27 | 2 ppm |
| 20 | Solvent Black 27 | 25 ppm |
| 21 | Solvent Black 29 | 2 ppm |
| 22 | Solvent Black 29 | 25 ppm |
| 23 | Solvent Black 29 | 100 ppm |
| 24 | Acid Yellow 17 | 2 ppm |
| 25 | Acid Yellow 17 | 25 ppm |
| 26 | Food Green 3 | 2 ppm |
| 27 | Food Green 3 | 25 ppm |
| 28 | Food Green 3 | 100 ppm |
| 29 | Vat Blue 6 | 25 ppm |
| 30 | Vat Blue 6 | 100 ppm |
| 31 | Solvent Blue 97 | 25 ppm |
| 32 | Solvent Blue 97 | 100 ppm |
| 33 | Food Red 7 | 2 ppm |
| 34 | Food Red 7 | 25 ppm |
| 35 | Pigment Blue 63 | 25 ppm |
| 36 | Pigment Blue 63 | 100 ppm |
| 37 | Pigment Green 7 | 2 ppm |
| 38 | Pigment Blue 15:3 | 2 ppm |
| 39 | Pigment Black 11 | 2 ppm |
| 40 | Pigment Black 11 | 25 ppm |
| 41 | Pigment Black 11 | 100 ppm |
| 42 | Pigment Yellow 147 | 2 ppm |
| 43 | Pigment Red 254 | 2 ppm |
| 44 | Pigment Orange 64 | 2 ppm |
| 45 | Pigment Black 7 | 2 ppm |
| 46 | Pigment Black 7 | 25 ppm |
| 47 | Pigment Black 7 | 2 ppm |
| 48 | Pigment Black 7 | 25 ppm |
| 49 | Pigment Black 7 | 2 ppm |
| 50 | Pigment Black 7 | 25 ppm |
| 51 | Pigment Black 7 | 100 ppm |
| 52 | Pigment Black 7 | 2 ppm |
| 53 | Pigment Black 7 | 25 ppm |
| 54 | Pigment Black 7 | 100 ppm |
| 55 | Pigment Blue 29 | 100 ppm |
| 56 | Pigment Violet 15 | 2 ppm |
| 57 | Pigment Violet 15 | 25 ppm |
| 58 | Pigment Violet 15 | 100 ppm |
| 59 | Pigment Blue 15:0 | 18 ppm |
| 60 | Pigment Violet 15 | 25 ppm |
| 61 | Pigment Violet 15 | 100 ppm |

TABLE 2

Coloring Agent(s) and Coloring Agent Loadings used in Control 2 and Samples 62-107.

| Sample | Coloring Agent(s) | Coloring Agent Loading(s) |
|---|---|---|
| Control 2 | None | — |
| 62 | Acid Blue 74 | 20 ppm |
| 63 | Acid Blue 74 | 35 ppm |
| 64 | Acid Blue 74 | 50 ppm |
| 65 | Acid Blue 9 | 20 ppm |
| 66 | Vat Blue 6 | 5 ppm |
| 67 | Vat Blue 6 | 10 ppm |
| 68 | Solvent Blue 97 | 0.5 ppm |
| 69 | Solvent Blue 97 | 1 ppm |
| 70 | Pigment Blue 63 | 5 ppm |
| 71 | Pigment Blue 63 | 10 ppm |
| 72 | Pigment Blue 29 | 10 ppm |
| 73 | Pigment Blue 29 | 15 ppm |
| 74 | Pigment Blue 29 | 20 ppm |
| 75 | Pigment Blue 29 | 30 ppm |
| 76 | Pigment Blue 29/Pigment Violet 15 | 9 ppm/6 ppm |
| 77 | Pigment Blue 29/Pigment Violet 15 | 12 ppm/8 ppm |
| 78 | Pigment Blue 29/Pigment Violet 15 | 15 ppm/10 ppm |
| 79 | Pigment Blue 29/Pigment Violet 15 | 18 ppm/12 ppm |
| 80 | Pigment Blue 29/Pigment Violet 15 | 21 ppm/14 ppm |
| 81 | Pigment Blue 29/Pigment Violet 15 | 24 ppm/16 ppm |
| 82 | Solvent Black 7 | 3 ppm |
| 83 | Solvent Black 7 | 5 ppm |
| 84 | Solvent Black 7 | 10 ppm |
| 85 | Solvent Black 7 | 17 ppm |
| 86 | Acid Blue 74 | 75 ppm |
| 87 | Acid Blue 9 | 35 ppm |
| 88 | Acid Blue 9 | 50 ppm |
| 89 | Solvent Blue 67 | 0.5 ppm |
| 90 | Solvent Blue 67 | 1 ppm |
| 91 | Solvent Black 27 | 5 ppm |
| 92 | Solvent Black 29 | 1 ppm |
| 93 | Solvent Black 29 | 5 ppm |
| 94 | Solvent Black 29 | 10 ppm |
| 95 | Food Green 3 | 5 ppm |
| 96 | Food Green 3 | 10 ppm |
| 97 | Pigment Blue 15:3 | 0.5 ppm |
| 98 | Pigment Blue 15:3 | 1 ppm |
| 99 | Pigment Black 11 | 2 ppm |
| 100 | Pigment Black 11 | 10 ppm |
| 101 | Pigment Black 7 | 0.5 ppm |
| 102 | Pigment Black 7 | 1 ppm |
| 103 | Pigment Black 7 | 5 ppm |
| 104 | Pigment Violet 15 | 35 ppm |
| 105 | Pigment Violet 15 | 50 ppm |
| 106 | Pigment Violet 15 | 35 ppm |
| 107 | Pigment Violet 15 | 50 ppm |

TABLE 3

Coloring Agent(s) and Coloring Agent Loadings used in Control 3 and Samples 108-155.

| Sample | Colorant CI Name | Colorant Level |
|---|---|---|
| Control 3 | None | — |
| 108 | Pigment Violet 15/Pigment Blue 29 | 35 ppm/4 ppm |
| 109 | Pigment Violet 15/Pigment Blue 29 | 35 ppm/6 ppm |
| 110 | Pigment Violet 15/Pigment Blue 29 | 35 ppm/8 ppm |
| 111 | Pigment Violet 15/Pigment Blue 29 | 12 ppm/3 ppm |
| 112 | Pigment Violet 15/Pigment Blue 29 | 20 ppm/5 ppm |
| 113 | Pigment Violet 15/Pigment Blue 29 | 28 ppm/7 ppm |
| 114 | Pigment Violet 15/Pigment Blue 29 | 36 ppm/9 ppm |
| 115 | Pigment Violet 15/Pigment Blue 29 | 22.5 ppm/2.5 ppm |
| 116 | Pigment Violet 15/Pigment Blue 29 | 31.5 ppm/3.5 ppm |
| 117 | Pigment Violet 15/Pigment Blue 29 | 40.5 ppm/4.5 ppm |

TABLE 3-continued

Coloring Agent(s) and Coloring Agent Loadings used in Control 3 and Samples 108-155.

| Sample | Colorant CI Name | Colorant Level |
|---|---|---|
| 118 | Acid Blue 9 | 23 ppm |
| 119 | Acid Blue 74 | 55 ppm |
| 120 | Vat Blue 6 | 12 ppm/3 ppm |
| 121 | Pigment Blue 29 | 25 ppm |
| 122 | Pigment Blue 29 | 40 ppm |
| 123 | Pigment Blue 29 | 45 ppm |
| 124 | Pigment Blue 29 | 50 ppm |
| 125 | Pigment Blue 29 | 55 ppm |
| 126 | Pigment Blue 29/Pigment Violet 15 | 27 ppm/18 ppm |
| 127 | Pigment Blue 29/Pigment Violet 15 | 30 ppm/20 ppm |
| 128 | Pigment Blue 29/Pigment Violet 15 | 36 ppm/24 ppm |
| 129 | Pigment Blue 29/Pigment Violet 15 | 42 ppm/28 ppm |
| 130 | Pigment Blue 29/Pigment Violet 15 | 48 ppm/32 ppm |
| 131 | Pigment Blue 29/Pigment Violet 15 | 54 ppm/36 ppm |
| 132 | Vat Blue 6/Acid Blue 74 | 2.3 ppm/7.7 ppm |
| 133 | Vat Blue 6/Acid Blue 74 | 4.6 ppm/15.4 ppm |
| 134 | Vat Blue 6/Acid Blue 74 | 6.9 ppm/23.1 ppm |
| 135 | Pigment Violet 15/Pigment Blue 29 | 35 ppm/2 ppm |
| 136 | Pigment Violet 15/Pigment Blue 29 | 50 ppm/2 ppm |
| 137 | Pigment Violet 15/Pigment Blue 29 | 50 ppm/4 ppm |
| 138 | Pigment Violet 15/Pigment Blue 29 | 50 ppm/6 ppm |
| 139 | Pigment Violet 15/Pigment Blue 29 | 50 ppm/8 ppm |
| 140 | Pigment Violet 15/Pigment Blue 29 | 44 ppm/11 ppm |
| 141 | Pigment Violet 15/Pigment Blue 29 | 52 ppm/13 ppm |
| 142 | Pigment Violet 15/Pigment Blue 29 | 49.5 ppm/5.5 ppm |
| 143 | Pigment Violet 15/Pigment Blue 29 | 58.5 ppm/6.5 ppm |
| 144 | Pigment Violet 15/Pigment Blue 29 | 67.5 ppm/7.5 ppm |
| 145 | Acid Blue 9 | 26 ppm |
| 146 | Acid Blue 9 | 29 ppm |
| 147 | Acid Blue 9 | 32 ppm |
| 148 | Acid Blue 74 | 60 ppm |
| 149 | Acid Blue 74 | 65 ppm |
| 150 | Acid Blue 74 | 70 ppm |
| 151 | Vat Blue 6 | 14 ppm |
| 152 | Vat Blue 6 | 16 ppm |
| 153 | Vat Blue 6 | 18 ppm |
| 154 | Vat Blue 6 | 20 ppm |
| 155 | Vat Blue 6/Acid Blue 74 | 9.2 ppm/30.8 ppm |

CIE L*a*b* color values were determined for each sample using a GretagMacBeth Color-Eye 7000A spectrophotometer. Measurements were taken in reflectance mode with a large area view using a cool white fluorescent light source and a 10° observer with specular reflectance included in the measurement. A UV filter was used to exclude UV light from the light source. The spectrophotometer's white calibration tile was placed behind the test plaques during the measurements. Measurements were taken on five separate 50.8 mm×76.2 mm×1.27 mm (2.00 inch×3.00 inch×0.05 inch) test plaques made using the polymer composition, and the five measurements were averaged to yield a single set of L*, a*, and b* values for the polymer composition. The L*, a*, and b* values for each sample are reported in Table 4, 5, or 6 below. The ΔL*, Δa*, and Δb* values for each sample are also reported in Table 4, 5, or 6 below. The ΔL*, Δa*, and Δb* values were determined by respectively subtracting the L*, a*, and b* values for the relevant control from the L*, a*, and b* values for the sample.

In addition to the CIE L*a*b* measurements described above, the plaques were also presented to a panel of evaluators for qualitative comparison to the relevant control. In particular, each panelist was presented with two plaques, one made using one of the above-described samples and the other made from the relevant control, laid flat against a white surface in an area lit by a cool white fluorescent light source. Each panelist was then asked to determine if the plaque made from the above-described sample was, compared to the relevant control, more visually appealing, less visually appealing, no different, or substantially colored. The sample plaques rated as more visually appealing by a majority of the panelists are identified in Table 4, 5, or 6 with a "yes" in the "Enhanced" column. Those sample plaques that were rated as less visually appealing, no different than the control plaque, or substantially colored are identified in Table 4, 5, or 6 with a "no" in the "Enhanced" column.

TABLE 4

L*, a*, b*, ΔL*, Δa*, and Δb* values and enhancement determinations for Control 1 and Samples 1-61.

| Sample | L* | a* | b* | ΔL* | Δa* | Δb* | Enhanced |
|---|---|---|---|---|---|---|---|
| Control 1 | 91.038 | −0.112 | 3.559 | — | — | — | — |
| 1 | 91.067 | −0.114 | 3.489 | 0.029 | −0.002 | −0.070 | Yes |
| 2 | 91.011 | −0.116 | 3.428 | −0.027 | −0.004 | −0.131 | Yes |
| 3 | 90.966 | −0.124 | 3.351 | −0.072 | −0.012 | −0.208 | Yes |
| 4 | 90.584 | −0.175 | 3.421 | −0.454 | −0.063 | −0.138 | Yes |
| 5 | 88.929 | −0.329 | 2.750 | −2.109 | −0.217 | −0.809 | Yes |
| 6 | 90.474 | −0.455 | 3.124 | −0.564 | −0.343 | −0.435 | Yes |
| 7 | 90.912 | −0.293 | 3.395 | −0.126 | −0.181 | −0.164 | Yes |
| 8 | 90.069 | −0.621 | 1.926 | −0.969 | −0.509 | −1.633 | Yes |
| 9 | 90.898 | −0.188 | 3.323 | −0.140 | −0.076 | −0.236 | Yes |
| 10 | 90.988 | −0.116 | 3.531 | −0.050 | −0.004 | −0.028 | Yes |
| 11 | 90.622 | −0.218 | 2.702 | −0.416 | −0.106 | −0.857 | Yes |
| 12 | 90.951 | −0.123 | 3.563 | −0.087 | −0.011 | 0.004 | No |
| 13 | 90.930 | −0.109 | 3.582 | −0.108 | 0.003 | 0.023 | No |
| 14 | 90.662 | −0.086 | 3.591 | −0.376 | 0.026 | 0.032 | No |
| 15 | 87.470 | 0.106 | 3.534 | −3.568 | 0.218 | −0.025 | No |
| 16 | 90.908 | −0.140 | 3.568 | −0.130 | −0.028 | 0.009 | No |
| 17 | 90.960 | −0.149 | 3.612 | −0.078 | −0.037 | 0.053 | No |
| 18 | 91.088 | −0.140 | 3.625 | 0.050 | −0.028 | 0.066 | No |
| 19 | 90.386 | 0.046 | 3.375 | −0.652 | 0.158 | −0.184 | No |
| 20 | 83.413 | 2.961 | 0.823 | −7.625 | 3.073 | −2.736 | No |
| 21 | 90.758 | 0.071 | 3.575 | −0.280 | 0.183 | 0.016 | No |
| 22 | 86.088 | 2.095 | 1.518 | −4.950 | 2.207 | −2.041 | No |
| 23 | 71.546 | 6.153 | −4.511 | −19.492 | 6.265 | −8.070 | No |
| 24 | 91.119 | −0.144 | 3.868 | 0.081 | −0.032 | 0.309 | No |
| 25 | 91.033 | −0.551 | 6.015 | −0.005 | −0.439 | 2.456 | No |
| 26 | 90.951 | −0.171 | 3.588 | −0.087 | −0.059 | 0.029 | No |
| 27 | 88.898 | −1.069 | 2.945 | −2.140 | −0.957 | −0.614 | No |
| 28 | 82.785 | −5.980 | 1.021 | −8.253 | −5.868 | −2.538 | No |
| 29 | 89.474 | −1.588 | 1.529 | −1.564 | −1.476 | −2.030 | No |
| 30 | 85.281 | −2.041 | −2.889 | −5.757 | −1.929 | −6.448 | No |
| 31 | 83.293 | −3.440 | −8.775 | −7.745 | −3.328 | −12.334 | No |
| 32 | 60.336 | −8.482 | −43.568 | −30.702 | −8.370 | −47.127 | No |
| 33 | 90.995 | −0.066 | 3.668 | −0.043 | 0.046 | 0.109 | No |
| 34 | 90.504 | 0.498 | 4.424 | −0.534 | 0.610 | 0.865 | No |
| 35 | 88.388 | −1.044 | 0.313 | −2.650 | −0.932 | −3.246 | No |
| 36 | 80.900 | −3.347 | −7.970 | −10.138 | −3.235 | −11.529 | No |
| 37 | 90.861 | −0.791 | 3.512 | −0.177 | −0.679 | −0.047 | No |
| 38 | 90.261 | −1.785 | 2.320 | −0.777 | −1.673 | −1.239 | No |
| 39 | 90.710 | −0.314 | 3.582 | −0.328 | −0.202 | 0.023 | No |
| 40 | 88.047 | 0.077 | 4.795 | −2.991 | 0.189 | 1.236 | No |
| 41 | 79.674 | 0.709 | 7.142 | −11.364 | 0.821 | 3.583 | No |
| 42 | 91.102 | −0.538 | 5.691 | 0.064 | −0.426 | 2.132 | No |
| 43 | 90.423 | 0.932 | 4.161 | −0.615 | 1.044 | 0.602 | No |
| 44 | 90.603 | 0.586 | 6.054 | −0.435 | 0.698 | 2.495 | No |
| 45 | 89.659 | −0.071 | 3.950 | −1.379 | 0.041 | 0.391 | No |
| 46 | 78.475 | 0.158 | 4.812 | −12.563 | 0.270 | 1.253 | No |
| 47 | 88.793 | 0.010 | 4.694 | −2.245 | 0.122 | 1.135 | No |
| 48 | 72.733 | 0.795 | 9.086 | −18.305 | 0.907 | 5.527 | No |
| 49 | 90.542 | −0.088 | 3.852 | −0.496 | 0.024 | 0.293 | No |
| 50 | 87.039 | 0.099 | 5.497 | −3.999 | 0.211 | 1.938 | No |
| 51 | 71.786 | 0.784 | 9.273 | −19.252 | 0.896 | 5.714 | No |
| 52 | 90.855 | −0.098 | 3.795 | −0.183 | 0.014 | 0.236 | No |
| 53 | 88.272 | 0.051 | 4.880 | −2.766 | 0.163 | 1.321 | No |
| 54 | 82.947 | 0.325 | 6.583 | −8.091 | 0.437 | 3.024 | No |
| 55 | 89.012 | −0.526 | 0.100 | −2.026 | −0.414 | −3.459 | No |
| 56 | 91.061 | −0.106 | 3.565 | 0.023 | 0.006 | 0.006 | No |
| 57 | 90.983 | −0.001 | 3.410 | −0.055 | 0.111 | −0.149 | No |
| 58 | 90.589 | 0.279 | 2.893 | −0.449 | 0.391 | −0.666 | No |
| 59 | 83.622 | −8.057 | −7.960 | −7.416 | −7.945 | −11.519 | No |
| 60 | 91.067 | −0.060 | 3.474 | 0.029 | 0.052 | −0.085 | No |
| 61 | 90.834 | 0.298 | 3.384 | −0.204 | 0.410 | −0.175 | No |

TABLE 5

L*, a*, b*, ΔL*, Δa*, and Δb* values and enhancement determinations for Control 2 and Samples 62-107.

| Sample | L* | a* | b* | ΔL* | Δa* | Δb* | Enhanced |
|---|---|---|---|---|---|---|---|
| Control 2 | 91.300 | −0.129 | 3.790 | — | — | — | — |
| 62 | 90.207 | −0.297 | 3.086 | −1.093 | −0.168 | −0.704 | Yes |
| 63 | 89.516 | −0.455 | 2.515 | −1.784 | −0.326 | −1.275 | Yes |
| 64 | 88.721 | −0.597 | 1.918 | −2.579 | −0.468 | −1.872 | Yes |
| 65 | 90.153 | −0.683 | 2.797 | −1.147 | −0.554 | −0.993 | Yes |
| 66 | 90.995 | −0.537 | 3.158 | −0.305 | −0.408 | −0.632 | Yes |
| 67 | 90.617 | −0.849 | 2.705 | −0.683 | −0.720 | −1.085 | Yes |
| 68 | 91.022 | −0.267 | 3.148 | −0.278 | −0.138 | −0.642 | Yes |
| 69 | 90.944 | −0.278 | 3.075 | −0.356 | −0.149 | −0.715 | Yes |
| 70 | 90.718 | −0.332 | 2.938 | −0.582 | −0.203 | −0.852 | Yes |
| 71 | 90.202 | −0.519 | 2.276 | −1.098 | −0.390 | −1.514 | Yes |
| 72 | 91.207 | −0.160 | 3.316 | −0.093 | −0.031 | −0.474 | Yes |
| 73 | 90.987 | −0.179 | 3.091 | −0.313 | −0.050 | −0.699 | Yes |
| 74 | 90.904 | −0.206 | 2.878 | −0.396 | −0.077 | −0.912 | Yes |
| 75 | 90.637 | −0.252 | 2.480 | −0.663 | −0.123 | −1.310 | Yes |
| 76 | 91.078 | −0.127 | 3.213 | −0.222 | 0.002 | −0.577 | Yes |
| 77 | 90.998 | −0.143 | 3.118 | −0.302 | −0.014 | −0.672 | Yes |
| 78 | 90.911 | −0.150 | 2.975 | −0.389 | −0.021 | −0.815 | Yes |
| 79 | 90.859 | −0.164 | 2.847 | −0.441 | −0.035 | −0.943 | Yes |
| 80 | 90.711 | −0.178 | 2.744 | −0.589 | −0.049 | −1.046 | Yes |
| 81 | 90.768 | −0.179 | 2.727 | −0.532 | −0.050 | −1.063 | Yes |
| 82 | 90.896 | −0.096 | 3.822 | −0.404 | 0.033 | 0.032 | No |
| 83 | 90.452 | −0.072 | 3.793 | −0.848 | 0.057 | 0.003 | No |
| 84 | 89.638 | −0.020 | 3.757 | −1.662 | 0.109 | −0.033 | No |
| 85 | 88.507 | 0.045 | 3.670 | −2.793 | 0.174 | −0.120 | No |
| 86 | 87.650 | −0.778 | 1.210 | −3.650 | −0.649 | −2.580 | No |
| 87 | 89.268 | −1.495 | 1.676 | −2.032 | −1.366 | −2.114 | No |
| 88 | 88.682 | −1.558 | 1.195 | −2.618 | −1.429 | −2.595 | No |
| 89 | 90.181 | −2.128 | 1.777 | −1.119 | −1.999 | −2.013 | No |
| 90 | 90.954 | −0.699 | 3.162 | −0.346 | −0.570 | −0.628 | No |
| 91 | 89.527 | 0.970 | 3.016 | −1.773 | 1.099 | −0.774 | No |
| 92 | 91.110 | 0.025 | 3.597 | −0.190 | 0.154 | −0.193 | No |
| 93 | 90.166 | 0.511 | 3.161 | −1.134 | 0.640 | −0.629 | No |
| 94 | 88.918 | 1.081 | 2.670 | −2.382 | 1.210 | −1.120 | No |
| 95 | 90.621 | −0.576 | 3.389 | −0.679 | −0.447 | −0.401 | No |
| 96 | 89.943 | −0.978 | 3.062 | −1.357 | −0.849 | −0.728 | No |
| 97 | 91.168 | −0.536 | 3.337 | −0.132 | −0.407 | −0.453 | No |
| 98 | 90.846 | −1.237 | 2.741 | −0.454 | −1.108 | −1.049 | No |
| 99 | 91.089 | −0.092 | 3.795 | −0.211 | 0.037 | 0.005 | No |
| 100 | 90.128 | −0.019 | 4.222 | −1.172 | 0.110 | 0.432 | No |
| 101 | 90.559 | −0.095 | 3.911 | −0.741 | 0.034 | 0.121 | No |
| 102 | 90.377 | −0.044 | 4.261 | −0.923 | 0.085 | 0.471 | No |
| 103 | 90.295 | −0.051 | 4.280 | −1.005 | 0.078 | 0.490 | No |
| 104 | 91.080 | 0.038 | 3.394 | −0.220 | 0.167 | −0.396 | No |
| 105 | 91.000 | 0.091 | 3.274 | −0.300 | 0.220 | −0.516 | No |
| 106 | 91.263 | 0.057 | 3.588 | −0.037 | 0.186 | −0.202 | No |
| 107 | 91.177 | 0.128 | 3.548 | −0.123 | 0.257 | −0.242 | No |

TABLE 6

L*, a*, b*, ΔL*, Δa*, and Δb* values and enhancement determinations for Control 3 and Samples 108-155.

| Sample | L* | a* | b* | ΔL* | Δa* | Δb* | Enhanced |
|---|---|---|---|---|---|---|---|
| Control 3 | 91.24 | −0.13 | 3.688 | — | — | — | — |
| 108 | 91.06 | −0.004 | 3.282 | −0.182 | 0.126 | −0.406 | Yes |
| 109 | 91.02 | −0.004 | 3.186 | −0.221 | 0.126 | −0.502 | Yes |
| 110 | 90.97 | −0.02 | 3.083 | −0.274 | 0.11 | −0.605 | Yes |
| 111 | 91.13 | −0.093 | 3.458 | −0.113 | 0.037 | −0.23 | Yes |
| 112 | 91.12 | −0.058 | 3.266 | −0.119 | 0.072 | −0.422 | Yes |
| 113 | 91 | −0.043 | 3.148 | −0.237 | 0.087 | −0.54 | Yes |
| 114 | 90.97 | −0.025 | 3.049 | −0.272 | 0.105 | −0.639 | Yes |
| 115 | 91.13 | −0.047 | 3.409 | −0.114 | 0.083 | −0.279 | Yes |
| 116 | 91.11 | −0.017 | 3.289 | −0.127 | 0.113 | −0.399 | Yes |
| 117 | 91.03 | 0.022 | 3.129 | −0.207 | 0.152 | −0.559 | Yes |
| 118 | 90.14 | −0.835 | 2.532 | −1.106 | −0.705 | −1.156 | Yes |
| 119 | 88.86 | −0.556 | 1.928 | −2.384 | −0.426 | −1.76 | Yes |
| 120 | 90.35 | −1.073 | 2.341 | −0.895 | −0.943 | −1.347 | Yes |
| 121 | 90.67 | −0.285 | 2.361 | −0.576 | −0.155 | −1.327 | Yes |
| 122 | 90.49 | −0.31 | 2.123 | −0.753 | −0.18 | −1.565 | Yes |
| 123 | 90.34 | −0.335 | 1.987 | −0.901 | −0.205 | −1.701 | Yes |
| 124 | 90.25 | −0.355 | 1.776 | −0.996 | −0.225 | −1.912 | Yes |
| 125 | 90.17 | −0.374 | 1.587 | −1.073 | −0.244 | −2.101 | Yes |
| 126 | 90.67 | −0.201 | 2.5 | −0.569 | −0.071 | −1.188 | Yes |
| 127 | 90.53 | −0.213 | 2.442 | −0.707 | −0.083 | −1.246 | Yes |
| 128 | 90.47 | −0.225 | 2.086 | −0.774 | −0.095 | −1.602 | Yes |
| 129 | 90.29 | −0.246 | 1.889 | −0.954 | −0.116 | −1.799 | Yes |
| 130 | 90.13 | −0.263 | 1.643 | −1.107 | −0.133 | −2.045 | Yes |
| 131 | 90 | −0.279 | 1.386 | −1.243 | −0.149 | −2.302 | Yes |
| 132 | 90.81 | −0.377 | 3.113 | −0.429 | −0.247 | −0.575 | Yes |
| 133 | 90.35 | −0.618 | 2.637 | −0.892 | −0.488 | −1.051 | Yes |
| 134 | 89.83 | −0.83 | 2.207 | −1.415 | −0.7 | −1.481 | Yes |
| 135 | 91.09 | −0.005 | 3.403 | −0.151 | 0.125 | −0.285 | No |
| 136 | 91.03 | 0.06 | 3.214 | −0.211 | 0.19 | −0.474 | No |
| 137 | 90.98 | 0.062 | 3.144 | −0.266 | 0.192 | −0.544 | No |
| 138 | 90.91 | 0.048 | 3.064 | −0.336 | 0.178 | −0.624 | No |
| 139 | 90.87 | 0.041 | 2.969 | −0.37 | 0.171 | −0.719 | No |
| 140 | 90.82 | −0.002 | 2.849 | −0.418 | 0.128 | −0.839 | No |
| 141 | 90.71 | 0.027 | 2.767 | −0.533 | 0.157 | −0.921 | No |
| 142 | 91.03 | 0.045 | 3.043 | −0.214 | 0.175 | −0.645 | No |
| 143 | 90.88 | 0.081 | 2.935 | −0.357 | 0.211 | −0.753 | No |
| 144 | 90.8 | 0.109 | 2.839 | −0.444 | 0.239 | −0.849 | No |
| 145 | 89.76 | −1.246 | 1.932 | −1.478 | −1.116 | −1.756 | No |
| 146 | 89.49 | −1.394 | 1.735 | −1.749 | −1.264 | −1.953 | No |
| 147 | 89.43 | −1.423 | 1.657 | −1.816 | −1.293 | −2.031 | No |
| 148 | 88.43 | −0.662 | 1.508 | −2.813 | −0.532 | −2.18 | No |
| 149 | 88.33 | −0.645 | 1.559 | −2.912 | −0.515 | −2.129 | No |
| 150 | 88 | −0.698 | 1.331 | −3.239 | −0.568 | −2.357 | No |
| 151 | 90.15 | −1.239 | 2.065 | −1.095 | −1.109 | −1.623 | No |
| 152 | 89.93 | −1.458 | 1.788 | −1.31 | −1.328 | −1.9 | No |
| 153 | 89.7 | −1.627 | 1.537 | −1.546 | −1.497 | −2.151 | No |
| 154 | 89.57 | −1.8 | 1.324 | −1.67 | −1.67 | −2.364 | No |
| 155 | 89.3 | −1.06 | 1.782 | −1.946 | −0.93 | −1.906 | No |

Figure 1:
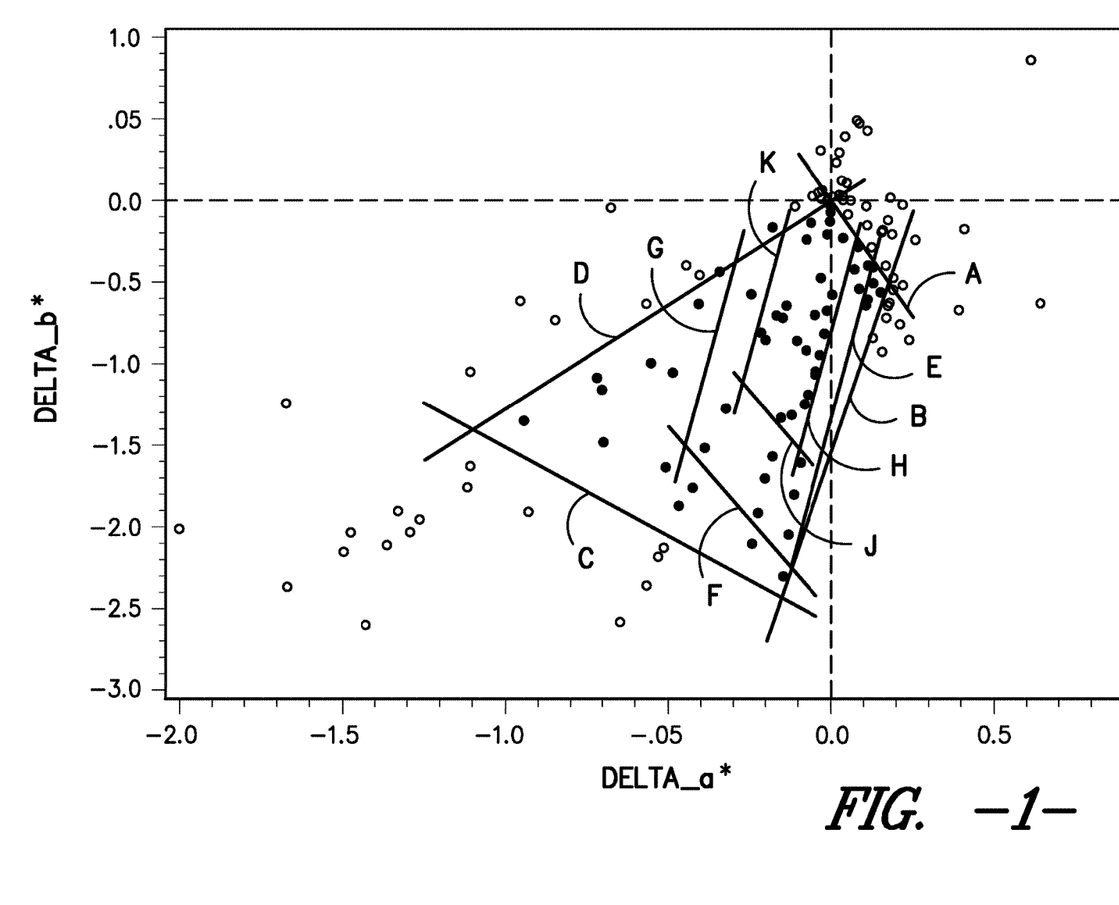
FIG. 1 is a plot of the Δa* and Δb* values for the polymer compositions described in the Example.
Figure 2:
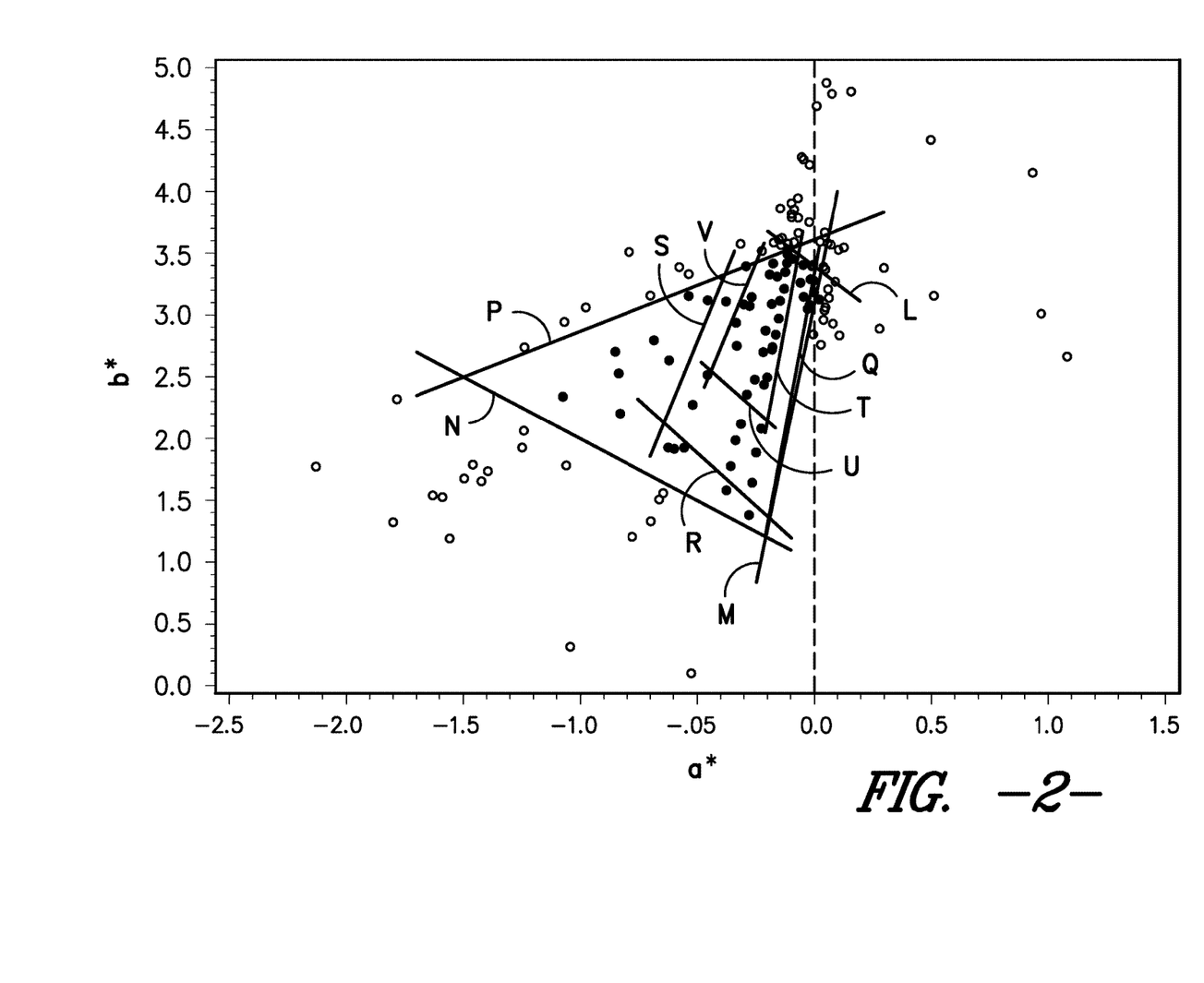
FIG. 2 is a plot of the a* and b* values for the polymer compositions described in the Example.

In order to aid in the analysis and comparison of the results, the CIE L*a*b* measurements and the visual evaluations were used to generate plots of the Δa* and Δb* values and the absolute a* and b* values for each plaque. The plot of the Δa* and Δb* values is depicted in FIG. 1. In the plot depicted in FIG. 1, the plaques which were determined to be more visually appealing than the relevant control are represented by a dot (●) located at the coordinates of the appropriate Δa* and Δb* values and those plaques which were determined to be less visually appealing, no different than the control, or substantially colored are represented by a circle (○) located at the coordinates of the appropriate Δa* and Δb* values. As can be seen from an examination of FIG. 1, those plaques which were determined to be more visually appealing than the relevant control fall within a particular area of the plot. This area is bound by the line segments A, B, C, and D, and each line segment can be defined by one of the following equations:

$$\Delta b^* = 0 - (2.8571 \times \Delta a^*) \quad (A)$$

$$\Delta b^* = -1.5231 + (5.8461 \times \Delta a^*) \quad (B)$$

$$\Delta b^* = -2.6000 - (1.0909 \times \Delta a^*) \quad (C)$$

$$\Delta b^* = 0 + (1.2727 \times \Delta a^*). \quad (D)$$

Thus, the area in which the more visually appealing plaques fall can be defined as those points in which the Δa* and Δb* values satisfy each of the following inequalities:

$$\Delta b^* \leq 0 - (2.8571 \times \Delta a^*)$$

$$\Delta b^* \geq -1.5231 + (5.8461 \times \Delta a^*)$$

$$\Delta b^* \geq -2.6000 - (1.0909 \times \Delta a^*)$$

$$\Delta b^* \leq 0 + (1.2727 \times \Delta a^*)$$

when $\Delta b^*$ is not zero. Within this area, Applicants believe that the area bound by line segments A, E, F, G, and D is more preferred, where each line segment is defined by one of the following equations:

$$\Delta b^* = 0 - (2.8571 \times \Delta a^*) \tag{A}$$

$$\Delta b^* = -1.325 + (7.4 \times \Delta a^*) \tag{E}$$

$$\Delta b^* = -2.5385 - (2.3077 \times \Delta a^*) \tag{F}$$

$$\Delta b^* = 1.8 + (7.3333 \times \Delta a^*) \tag{G}$$

$$\Delta b^* = 0 + (1.2727 \times \Delta a^*). \tag{D}$$

This area can be defined as those points in which the $\Delta a^*$ and $\Delta b^*$ values satisfy each of the following inequalities:

$$\Delta b^* \leq 0 - (2.8571 \times \Delta a^*)$$

$$\Delta b^* \geq -1.325 + (7.4 \times \Delta a^*)$$

$$\Delta b^* \geq -2.5385 - (2.3077 \times \Delta a^*)$$

$$\Delta b^* \leq 1.8 + (7.3333 \times \Delta a^*)$$

$$\Delta b^* \leq 0 + (1.2727 \times \Delta a^*)$$

when $\Delta b^*$ is not zero. Applicants also believe that the area bound by line segments A, H, J, K, and D is even more preferred, where each line segment is defined by one of the following equations:

$$\Delta b^* = 0 - (2.8571 \times \Delta a^*) \tag{A}$$

$$\Delta b^* = -0.8 + (7.4 \times \Delta a^*) \tag{H}$$

$$\Delta b^* = -1.75 - (2.3077 \times \Delta a^*) \tag{J}$$

$$\Delta b^* = 0.9 + (7.3333 \times \Delta a^*) \tag{K}$$

$$\Delta b^* = 0 + (1.2727 \times \Delta a^*). \tag{D}$$

This area can be defined as those points in which the $\Delta a^*$ and $\Delta b^*$ values satisfy each of the following inequalities:

$$\Delta b^* \leq 0 - (2.8571 \times \Delta a^*)$$

$$\Delta b^* \geq -0.8 + (7.4 \times \Delta a^*)$$

$$\Delta b^* \geq -1.75 - (2.3077 \times \Delta a^*)$$

$$\Delta b^* \leq 0.9 + (7.3333 \times \Delta a^*)$$

$$\Delta b^* \leq 0 + (1.2727 \times \Delta a^*)$$

when $\Delta b^*$ is not zero.

As noted above, the CIE L*a*b* measurements and the visual evaluations were used to generate plots of the absolute a* and b* values for each plaque. The plot of the a* and b* values is depicted in FIG. 2. In the plot depicted in FIG. 2, the plaques which were determined to be more visually appealing than the relevant control are represented by a dot (●) located at the coordinates of the appropriate a* and b* values and those plaques which were determined to be less visually appealing, no different than the control, or substantially colored are represented by a circle (○) located at the coordinates of the appropriate a* and b* values. As can be seen from an examination of FIG. 2, those plaques which were determined to be more visually appealing than the relevant control fall within a particular area of the plot. This area is bound by the line segments L, M, N, and P, and each line segment can be defined by one of the following equations:

$$b^* = 3.4 - (1.4196 \times a^*) \tag{L}$$

$$b^* = 3.1 + (9 \times a^*) \tag{M}$$

$$b^* = 1 - a^* \tag{N}$$

$$b^* = 3.6174 + (0.7449 \times a^*). \tag{P}$$

Thus, the area in which the more visually appealing plaques fall can be defined as those points in which the a* and b* values satisfy each of the following inequalities:

$$b^* \leq 3.4 - (1.4196 \times a^*)$$

$$b^* \geq 3.1 + (9 \times a^*)$$

$$b^* \geq 1 - a$$

$$b^* \leq 3.6174 + (0.7449 \times a^*).$$

Within this area, Applicants believe that the area bound by line segments L, Q, R, S, and P is more preferred, where each line segment is defined by one of the following equations:

$$b^* = 3.4 - (1.4196 \times a^*) \tag{L}$$

$$b^* = 3.35 + (10.25 \times a^*) \tag{Q}$$

$$b^* = 1.0313 - (1.7187 \times a^*) \tag{R}$$

$$b^* = 5.1 + (4.6364 \times a^*) \tag{S}$$

$$b^* = 3.6174 + (0.7449 \times a^*). \tag{P}$$

This area can be defined as those points in which the a* and b* values satisfy each of the following inequalities:

$$b^* \leq 3.4 - (1.4196 \times a^*)$$

$$b^* \geq 3.35 + (10.25 \times a^*)$$

$$b^* \geq 1.0313 - (1.7187 \times a^*)$$

$$b^* \leq 5.1 + (4.6364 \times a^*)$$

$$b^* \leq 3.6174 + (0.7449 \times a^*).$$

Applicants also believe that the area bound by line segments L, T, U, V, and P is even more preferred, where each line segment is defined by one of the following equations:

$$b^* = 3.4 - (1.4196 \times a^*) \tag{L}$$

$$b^* = 4.2 + (10.25 \times a^*) \tag{T}$$

$$b^* = 1.8 - (1.7187 \times a^*) \tag{U}$$

$$b^* = 4.6 + (4.6364 \times a^*) \tag{V}$$

$$b^* = 3.6174 + (0.7449 \times a^*). \tag{P}$$

This area can be defined as those points in which the a* and b* values satisfy each of the following inequalities:

$$b^* \leq 3.4 - (1.4196 \times a^*)$$

$$b^* \geq 4.2 + (10.25 \times a^*)$$

$$b^* \geq 1.8 - (1.7187 \times a^*)$$

$$b^* \leq 4.6 + (4.6364 \times a^*)$$

$$b^* \leq 3.6174 + (0.7449 \times a^*)$$

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for producing a thermoplastic polymer composition, the method comprising the steps of:
    (a) providing a thermoplastic polymer selected from the group consisting of polypropylene homopolymers, polypropylene random copolymers, and mixtures thereof;
    (b) providing an additive composition comprising:
        (i) at least one clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$; and
        (ii) a coloring agent; and
    (c) mixing the thermoplastic polymer and the additive composition to produce a thermoplastic polymer composition,
    wherein the thermoplastic polymer and the additive composition are separately provided; wherein the amount of clarifying agent in the thermoplastic polymer composition is from about 100 ppm to about 5,000 ppm based on the total weight of the thermoplastic polymer, the clarifying agent, and the coloring agent; wherein the amount of coloring agent present in the thermoplastic polymer composition is sufficient to produce a thermoplastic polymer composition exhibiting a Δa* value and a Δb* value satisfying each of the following inequalities $$\Delta b^* \leq 0-(2.8571\times\Delta a^*)$$

$$\Delta b^* \geq -1.5231+(5.8461\times\Delta a^*)$$

$$\Delta b^* \geq -2.6000-(1.0909\times\Delta a^*)$$

$$\Delta b^* \leq 0+(1.2727\times\Delta a^*)$$

wherein Δb* is not zero; wherein the Δa* value and the Δb* value are calculated by measuring an a* value and a b* value exhibited by a 1.27 mm (50 mil) plaque made from a control thermoplastic polymer composition, measuring an a* value and a b* value exhibited by a 1.27 mm (50 mil) plaque made from the thermoplastic polymer composition, and subtracting the a* and b* values for the plaque made from the control thermoplastic polymer composition from the a* and b* values for the plaque made from the thermoplastic polymer composition; and wherein the control thermoplastic polymer composition contains the thermoplastic polymer and the clarifying agent but does not contain the coloring agent.

2. The method of claim 1, wherein the L* value of a 1.27 mm (50 mil) plaque made using the thermoplastic polymer composition is about 88 or greater.

3. The method of claim 1, wherein the clarifying agent is an acetal compound conforming to the structure of Formula (I).

4. The method of claim 3, wherein the clarifying agent is selected from the group consisting of (a) a compound of Formula (I) in which $R_1$, $R_2$, $R_3$, $R_4$, $R_5$, $R_6$, $R_7$, $R_8$, $R_9$, and $R_{10}$ are each hydrogen and $R_{11}$ is —$CHOHCH_2OH$, (b) a compound of Formula (I) in which $R_1$, $R_2$, $R_4$, $R_5$, $R_6$, $R_7$, $R_9$, and $R_{10}$ are each hydrogen, $R_3$ and $R_8$ are each a methyl group, and $R_{11}$ is —$CHOHCH_2OH$, (c) a compound of

Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —CHOHCH$_2$OH, and (d) mixtures of at least two of (a), (b), and (c).

5. The method of claim 4, wherein the clarifying agent is a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —CHOHCH$_2$OH.

6. The method of claim 1, wherein the clarifying agent is present in an amount of about 1,000 ppm to about 2,500 ppm.

7. The method of claim 1, wherein the coloring agent is a pigment.

8. A method for producing a thermoplastic polymer composition, the method comprising the steps of:
   (a) providing a thermoplastic polymer selected from the group consisting of polypropylene homopolymers, polypropylene random copolymers, and mixtures thereof;
   (b) providing a clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

(I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —CH$_2$OH and —CHOHCH$_2$OH;
   (c) providing a coloring agent; and
   (d) mixing the thermoplastic polymer, the clarifying agent, and the coloring agent to produce a thermoplastic polymer composition,
   wherein the thermoplastic polymer, the clarifying agent, and the coloring agent are each separately provided; wherein the amount of clarifying agent present in the thermoplastic polymer composition is from about 100 ppm to about 5,000 ppm based on the total weight of the thermoplastic polymer, the clarifying agent, and the coloring agent; wherein the amount of coloring agent in the thermoplastic polymer composition is sufficient to produce a thermoplastic polymer composition exhibiting a $\Delta a^*$ value and a $\Delta b^*$ value satisfying each of the following inequalities $$\Delta b^* \leq 0 - (2.8571 \times \Delta a^*)$$

$$\Delta b^* \geq -1.5231 + (5.2461 \times \Delta a^*)$$

$$\Delta b^* \geq -2.6000 - (1.0909 \times \Delta a^*)$$

$$\Delta b^* \leq 0 + (1.2727 \times \Delta a^*)$$

wherein $\Delta b^*$ is not zero; wherein the $\Delta a^*$ value and the $\Delta b^*$ value are calculated by measuring an a* value and a b* value exhibited by a 1.27 mm (50 mil) plaque made from a control thermoplastic polymer composition, measuring an a* value and a b* value exhibited by a 1.27 mm (50 mil) plaque made from the thermoplastic polymer composition, and subtracting the a* and b* values for the plaque made from the control thermoplastic polymer composition from the a* and b* values for the plaque made from the thermoplastic polymer composition; and wherein the control thermoplastic polymer composition contains the thermoplastic polymer and the clarifying agent but does not contain the coloring agent.

9. The method of claim 8, wherein the L* value of a 1.27 mm (50 mil) plaque made using the thermoplastic polymer composition is about 88 or greater.

10. The method of claim 8, wherein the clarifying agent is an acetal compound conforming to the structure of Formula (I).

11. The method of claim 10, wherein the clarifying agent is selected from the group consisting of (a) a compound of Formula (I) in which $R_1$, $R_2$, $R_3$, $R_4$, $R_5$, $R_6$, $R_7$, $R_8$, $R_9$, and $R_{10}$ are each hydrogen and $R_{11}$ is —CHOHCH$_2$OH, (b) a compound of Formula (I) in which $R_1$, $R_2$, $R_4$, $R_5$, $R_6$, $R_7$, $R_9$, and $R_{10}$ are each hydrogen, $R_3$ and $R_8$ are each a methyl group, and $R_{11}$ is —CHOHCH$_2$OH, (c) a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —CHOHCH$_2$OH, and (d) mixtures of at least two of (a), (b), and (c).

12. The method of claim 11, wherein the clarifying agent is a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —CHOHCH$_2$OH.

13. The method of claim 8, wherein the clarifying agent is present in an amount of about 1,000 ppm to about 2,500 ppm.

14. The method of claim 8, wherein the coloring agent is a pigment.

15. A method for producing a thermoplastic polymer composition, the method comprising the steps of:
   (a) providing a thermoplastic polymer selected from the group consisting of polypropylene homopolymers, polypropylene random copolymers, and mixtures thereof;
   (b) providing an additive composition comprising:
      (i) at least one clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

(I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$; and (ii) a coloring agent; and (c) mixing the thermoplastic polymer and the additive composition to produce a thermoplastic polymer composition, wherein the thermoplastic polymer and the additive composition are separately provided; wherein the amount of clarifying agent in the thermoplastic polymer composition is from about 100 ppm to about 5,000 ppm based on the total weight of the thermoplastic polymer, the clarifying agent, and the coloring agent; wherein the amount of coloring agent present in the thermoplastic polymer composition is sufficient to produce a thermoplastic polymer composition exhibiting an a* value and a b* value satisfying each of the following inequalities $b^* \leq 3.4 - (1.4196 \times a^*)$ $b^* \geq 3.1 + (9 \times a^*)$ $b^* \geq 1 - a^*$ $b^* \leq 3.6174 + (0.7449 \times a^*)$ wherein the a* value and the b* value are determined by measuring an a* value and a b* value exhibited by a 1.27 mm (50 mil) plaque made from the thermoplastic polymer composition.

16. The method of claim 15, wherein the L* value of a 1.27 mm (50 mil) plaque made using the thermoplastic polymer composition is about 88 or greater.

17. The method of claim 15, wherein the clarifying agent is an acetal compound conforming to the structure of Formula (I).

18. The method of claim 17, wherein the clarifying agent is selected from the group consisting of (a) a compound of Formula (I) in which $R_1$, $R_2$, $R_3$, $R_4$, $R_5$, $R_6$, $R_7$, $R_8$, $R_9$, and $R_{10}$ are each hydrogen and $R_{11}$ is —$CHOHCH_2OH$, (b) a compound of Formula (I) in which $R_1$, $R_2$, $R_4$, $R_5$, $R_6$, $R_7$, $R_9$, and $R_{10}$ are each hydrogen, $R_3$ and $R_8$ are each a methyl group, and $R_{11}$ is —$CHOHCH_2OH$, (c) a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —$CHOHCH_2OH$, and (d) mixtures of at least two of (a), (b), and (c).

19. The method of claim 18, wherein the clarifying agent is a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —$CHOHCH_2OH$.

20. The method of claim 15, wherein the clarifying agent is present in an amount of about 1,000 ppm to about 2,500 ppm.

21. The method of claim 15, wherein the coloring agent is a pigment.

22. A method for producing a thermoplastic polymer composition, the method comprising the steps of:

(a) providing a thermoplastic polymer selected from the group consisting of polypropylene homopolymers, polypropylene random copolymers, and mixtures thereof;

(b) providing a clarifying agent selected from the group consisting of trisamides, aluminum 2,2'-methylenebis-(4,6-di-tert-butylphenyl) phosphate, lithium 2,2'-methylenebis(4,6-di-tert-butylphenyl) phosphate, monocarboxylate compounds, and acetal compounds conforming to the structure of Formula (I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, and halogens; and wherein $R_{11}$ is a hydroxyalkyl group selected from the group consisting of —$CH_2OH$ and —$CHOHCH_2OH$;

(c) providing a coloring agent; and (d) mixing the thermoplastic polymer, the clarifying agent, and the coloring agent to produce a thermoplastic polymer composition, wherein the thermoplastic polymer, the clarifying agent, and the coloring agent are each separately provided; wherein the amount of clarifying agent present in the thermoplastic polymer composition is from about 100 ppm to about 5,000 ppm based on the total weight of the thermoplastic polymer, the clarifying agent, and the coloring agent; wherein the amount of coloring agent in the thermoplastic polymer composition is sufficient to produce a thermoplastic polymer composition exhibiting an a* value and a b* value satisfying each of the following inequalities $b^* \leq 3.4 - (1.4196 \times a^*)$ $b^* \geq 3.1 + (9 \times a^*)$ $b^* \geq 1 - a^*$ $b^* \leq 3.6174 + (0.7449 \times a^*)$ wherein the a* value and the b* value are determined by measuring an a* value and a b* value exhibited by a 1.27 mm (50 mil) plaque made from the thermoplastic polymer composition.

23. The method of claim 22, wherein the L* value of a 1.27 mm (50 mil) plaque made using the thermoplastic polymer composition is about 88 or greater.

24. The method of claim 22, wherein the clarifying agent is an acetal compound conforming to the structure of Formula (I).

25. The method of claim 24, wherein the clarifying agent is selected from the group consisting of (a) a compound of Formula (I) in which $R_1$, $R_2$, $R_3$, $R_4$, $R_5$, $R_6$, $R_7$, $R_8$, $R_9$, and $R_{10}$ are each hydrogen and $R_{11}$ is —$CHOHCH_2OH$, (b) a compound of Formula (I) in which $R_1$, $R_2$, $R_4$, $R_5$, $R_6$, $R_7$, $R_9$, and $R_{10}$ are each hydrogen, $R_3$ and $R_8$ are each a methyl group, and $R_{11}$ is —$CHOHCH_2OH$, (c) a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —$CHOHCH_2OH$, and (d) mixtures of at least two of (a), (b), and (c).

26. The method of claim 25, wherein the clarifying agent is a compound of Formula (I) in which $R_1$, $R_4$, $R_5$, $R_6$, $R_7$, and $R_{10}$ are each hydrogen, $R_2$, $R_3$, $R_8$, and $R_9$ are each a methyl group, and $R_{11}$ is —$CHOHCH_2OH$.

27. The method of claim 22, wherein the clarifying agent is present in an amount of about 1,000 ppm to about 2,500 ppm.

28. The method of claim 22, wherein the coloring agent is a pigment.

\* \* \* \* \*

UNITED STATES PATENT AND TRADEMARK OFFICE
CERTIFICATE OF CORRECTION

PATENT NO. : 10,800,902 B2
APPLICATION NO. : 15/485916
DATED : October 13, 2020
INVENTOR(S) : Todd D. Danielson, Jamie B. Myers and Jennifer S. Morgan It is certified that error appears in the above-identified patent and that said Letters Patent is hereby corrected as shown below:

In Column 25, Claim 8, Line 63, "$\Delta b^* \geq -1.5231 + (5.2461 \times \Delta a^*)$" should be "$\Delta b^* \geq -1.5231 + (5.8461 \times \Delta a^*)$".

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*